United States Patent
Chen et al.

(10) Patent No.: US 11,990,828 B2
(45) Date of Patent: May 21, 2024

(54) SWITCHING POWER SUPPLY CIRCUIT, CONTROL CIRCUIT AND CONTROL METHOD THEREOF

(71) Applicant: SG MICRO CORP, Beijing (CN)

(72) Inventors: Jianchun Chen, Beijing (CN); Shoubao Yan, Beijing (CN); Xiang Yu, Beijing (CN)

(73) Assignee: SG MICRO CORP, Beijing (CN)

( * ) Notice: Subject to any disclaimer, the term of this patent is extended or adjusted under 35 U.S.C. 154(b) by 257 days.

(21) Appl. No.: 17/631,688

(22) PCT Filed: Apr. 20, 2020

(86) PCT No.: PCT/CN2020/085587
§ 371 (c)(1),
(2) Date: Jan. 31, 2022

(87) PCT Pub. No.: WO2021/017538
PCT Pub. Date: Feb. 4, 2021

(65) Prior Publication Data
US 2022/0278615 A1    Sep. 1, 2022

(30) Foreign Application Priority Data
Aug. 1, 2019   (CN) .......................... 201910705913.6

(51) Int. Cl.
*H02M 3/156*    (2006.01)
*H02M 1/00*    (2006.01)
(Continued)

(52) U.S. Cl.
CPC ........... *H02M 1/0029* (2021.05); *H02M 1/08* (2013.01); *H02M 1/4225* (2013.01); *H02M 3/156* (2013.01); *H02M 3/157* (2013.01)

(58) Field of Classification Search
CPC .... H02M 1/0029; H02M 1/08; H02M 1/4225; H02M 3/156; H02M 3/157
See application file for complete search history.

(56) References Cited

U.S. PATENT DOCUMENTS 10,152,077 B2    12/2018  Chiu et al.
10,270,335 B2     4/2019  Gschwind-Schilling
(Continued)

FOREIGN PATENT DOCUMENTS

| CN | 102761240 A | 10/2012 |
|---|---|---|
| CN | 106664015 A | 5/2017 |
| TW | 201547170 A | 12/2015 |

OTHER PUBLICATIONS

International Search Report (including English translation) and Written Opinion for International Application No. PCT/CN2020/085587, dated Jul. 17, 2020, 8 pages.

*Primary Examiner* — Alex Torres-Rivera
(74) *Attorney, Agent, or Firm* — Westman, Champlin & Koehler, P.A.

(57) ABSTRACT

Disclosed is a switching power supply circuit and a control circuit and a control method thereof. The control circuit comprises a control unit and a driving unit. The control unit controls the driving unit to provide a driving signal with different driving strengths according to a comparison result between a switching voltage and a preset voltage, so as to adjust a speed of turning the power switch off. By controlling the driving strength of the driving signal, a rising rate of the switching voltage can be improved, a spike of the switching voltage can be reduced, various components in the circuit can be protected from being damaged by the spike, and service life and reliability of the circuit can be improved.

18 Claims, 4 Drawing Sheets

(51) Int. Cl.
*H02M 1/08* (2006.01)
*H02M 1/42* (2007.01)
*H02M 3/157* (2006.01)

(56) References Cited

U.S. PATENT DOCUMENTS

| | | | |
|---|---|---|---|
| 10,587,262 B1 * | 3/2020 | Morini | H03K 17/165 |
| 10,620,239 B2 * | 4/2020 | Tajima | G01R 19/165 |
| 11,121,629 B2 * | 9/2021 | Ou | H03K 17/163 |
| 2012/0286752 A1 * | 11/2012 | Tsukiji | H04N 5/63 |
| | | | 323/282 |
| 2014/0176105 A1 | 6/2014 | Yamaguchi et al. | |
| 2015/0355663 A1 | 12/2015 | Chiu et al. | |
| 2017/0214317 A1 | 7/2017 | Gschwind-Schilling | |
| 2019/0238129 A1 * | 8/2019 | Fukushima | H02M 1/08 |

* cited by examiner

- Prior Art -

FIG. 1

- Prior Art -

SWITCHING POWER SUPPLY CIRCUIT, CONTROL CIRCUIT AND CONTROL METHOD THEREOF

CROSS REFERENCE TO RELATED APPLICATIONS

This application is a section 371 National Stage application of In No. PCT/CN2020/085587, which is tiled on 20 Apr. 2020 and published as WO2021/017538, on Feb. 4, 2021, and claims priority to Chinese patent application No. 201910705913.6, filed on Aug. 1, 2019, entitled "SWITCHING POWER SUPPLY CIRCUIT, CONTROL CIRCUIT AND CONTROL METHOD THEREOF", the entire contents of which are incorporated herein by reference in their entireties.

FIELD OF THE DISCLOSURE

The present disclosure relates to a technical field of electronics, in particular to a switching power supply circuit, a control circuit and a control method thereof.

DESCRIPTION OF THE RELATED ART

At present, in various electronic circuit systems, due to existence of lightning, power start-up and switch switching, electrostatic discharge or other factors, a voltage spike with short duration but high amplitude may be generated between two terminals of an electronic component, which may cause damage to the electronic component in the circuit.

For example, in a switching power supply circuit, a power switch is configured to be turned on and off rapidly, so that voltages and currents in the circuit will be changed rapidly. These rapidly changed voltages and currents may generate surges and currents in the circuit due to existence of a power supply wire, a parasitic parameter or other factors, and may affect normal operations of the circuit.

Figure 1:
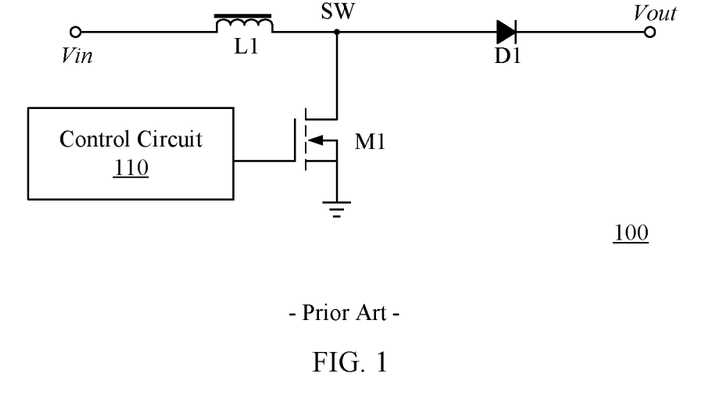
FIG. 1 shows a circuit schematic diagram of a switching power supply circuit according to the prior art.
Figure 2:
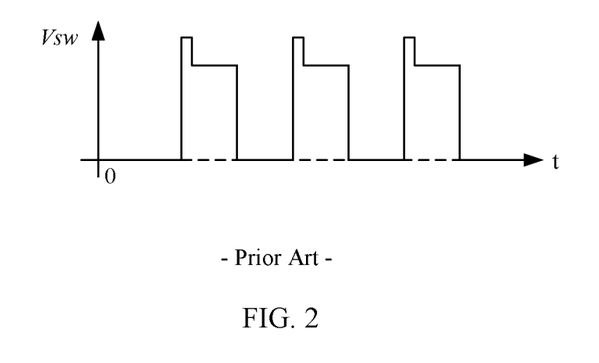
FIG. 2 shows a voltage waveform diagram of the node SW between the inductor and the power switch as shown in FIG. 1.

FIG. 1 shows a common switching power supply circuit 100, including an inductor L1, a power switch M1, a freewheeling diode D1 and a control circuit 110. The inductor L1 and the power switch M1 are connected in series between a terminal, which receives an input DC (direct current) voltage Vin, and ground, an anode of the freewheeling diode D1 is connected to a node between the inductor L1 and the power switch M1, and a cathode of the freewheeling diode D1 is connected to a terminal for providing an output DC voltage Vout. The control circuit 100 is configured to control the power switch M1 to be turned on and off, so that the output DC voltage Vout can be obtained by use of the inductor L1 according to the input DC voltage Vin. When the power switch M1 is being switched between on state and off state, a voltage spike may occur at an intermediate node SW between the inductor L1 and the power switch M1, as shown in FIG. 2, since a current flowing through the inductor cannot change abruptly. This voltage spike may cause damage to the power switch M1 and reduce the service life of the power switch M1.

An existing technical solution absorbs the generated voltage spike by adding resistors and capacitors in a peripheral circuit, which increases circuit area, increases circuit cost and causes a loss of system energy.

SUMMARY OF THE DISCLOSURE

In view of this, an objective of the present disclosure is to provide a switching power supply circuit, a control circuit of the switching power supply circuit and a control method of the switching power supply circuit, which can effectively reduce a spike of a switching voltage and improve circuit reliability.

According to a first aspect of the present disclosure, a control circuit of a switching power supply circuit is provided, wherein the switching power supply circuit comprises: a power switch and an inductor connected in series between an voltage input terminal and ground, an input voltage is applied to the voltage input terminal, and an output voltage is provided by a switching node between the power switch and the inductor, wherein, the control circuit comprises: a driving unit, configured to provide a driving signal to a control terminal of the power switch in accordance with a switch control signal; and a control unit, which is connected to the switching node to obtain a switching voltage, configured to generate a logic control signal according to a comparison result between the switching voltage and a preset voltage, and to control the driving unit to provide the driving signal with different driving strengths according to the logic control signal, so as to adjust a speed of turning the power switch off, wherein, the driving signal is configured to charge or discharge the control terminal of the power switch, and during a phase for discharging the control terminal of the power switch, the driving signal has a first driving strength when the switching voltage is lower than the preset voltage, and the driving signal has a second driving strength lower than the first driving strength when the switching voltage is greater than/equal to the preset voltage.

In some embodiments, the driving unit comprises: a first driver providing a first driving signal according to the switch control signal; a second driver providing a second driving signal according to the logic control signal; and an output node on which the first driving signal and the second driving signal are superimposed to provide the driving signal.

In some embodiments, the control unit comprises: a sampling module configured to obtain a voltage sample signal according to the switching voltage; a comparator configured to compare the voltage sample signal with a reference voltage signal which representing the preset voltage, so as to obtain a result signal; and a logic module configured to obtain the logic control signal according to the switch control signal and the result signal.

In some embodiments, during the phase for discharging the control terminal of the power switch: when the result signal indicates that the voltage sample signal is lower than the reference voltage signal, the output node is discharged by the first driving signal and the second driving signal, so that the driving signal with the first driving strength is obtained; when the result signal indicates that the voltage sample signal is greater than/equal to the reference voltage signal, the output node is discharged by the first driving signal and the second driving signal stops discharging the output node, so that the driving signal with the second driving strength is obtained.

In some embodiments, during a phase for charging the control terminal of the power switch, the output node is charged by the first driving signal.

In some embodiments, the logic module is an AND gate.

In some embodiments, the sampling module comprises: a first resistor and a second resistor connected in series between the switching node and a reference ground, wherein a second end of the first resistor and a first end of the second resistor are connected and provide the voltage sample signal, and a second end of the second resistor is connected to the reference ground; and a sampling capacitor connected between the switching node and the first end of the first resistor.

In some embodiments, the sampling capacitor is a high-voltage capacitor.

In some embodiments, the first driver comprises a first transistor and a second transistor connected in series between a first reference voltage and a second reference voltage, a control terminal of the first transistor and a control terminal of the second transistor are connected to each other to receive the switch control signal, wherein, the first reference voltage is greater than the second reference voltage, the first transistor is configured to charge the output node according to the first reference voltage when the first transistor is under on state, and the second transistor is configured to discharge the output node according to the second reference voltage when the second transistor is under on state.

In some embodiments, the second driver comprises a third transistor connected between the output node and the second reference voltage, wherein a control terminal of the third transistor is for receiving the logic control signal, the third transistor is configured to discharge the output node according to the second reference voltage when the third transistor is under on state.

In some embodiments, the first transistor is a P-type field effect transistor, and the second transistor and the third transistor are N-type field effect transistors.

According to a second aspect of the disclosure, a control method of a switching power supply circuit is provided, the switching power supply circuit comprises a power switch and an inductor connected in series between an input voltage terminal and ground, an input voltage is applied to the input voltage terminal and an output voltage is provided by a switching node between the power switch and the inductor, wherein, the control method comprises: providing a driving signal to a control terminal of the power switch according to a switch control signal; and obtaining a switching voltage of the switching node, obtaining a logic control signal according to a comparison result between the switching voltage and a preset voltage, and providing the driving signal with different driving strengths to the control terminal of the power switch according to the logic control signal, so as to adjust a speed of turning the power switch off, wherein, the driving signal is configured to charge or discharge the control terminal of the power switch, during a phase for discharging the control terminal of the power switch, the driving signal has a first driving strength when the switching voltage is lower than the preset voltage, and the driving signal has a second driving strength lower than the first driving strength when the switching voltage is greater than/equal to the preset voltage.

In some embodiments, the control method further comprises: providing a first driving signal according to the switch control signal; providing a second driving signal according to the logic control signal; and providing the driving signal according to a superposition of the first driving signal and the second driving signal.

In some embodiments, the step of obtaining the logic control signal according to the comparison result of the switching voltage and the preset voltage comprises: obtaining a voltage sample signal according to the switching voltage; comparing the voltage sample signal with a reference voltage signal representing the preset voltage, so as to obtain a result signal; and obtaining the logic control signal according to the switch control signal and the result signal.

In some embodiments, during the phase for discharging the control terminal of the power switch: when the result signal indicates that the voltage sample signal is lower than the reference voltage signal, the output node is discharged by the first driving signal and the second driving signal, so that the driving signal with the first driving strength is obtained; when the result signal indicates that the voltage sample signal is greater than/equal to the reference voltage signal, the output node is discharged by the first driving signal, and the second driving signal stops discharging the output node, so that the driving signal with the second driving strength is obtained.

In some embodiments, the control method further comprises: during a phase for charging the control terminal of the power switch, charging the output node by the first driving signal.

In some embodiments, the logic control signal is obtained according to an AND operation result of a logic value of the switch control signal and a logic value of the result signal.

According to a third aspect of the present disclosure, a switching power supply circuit is provided and comprises: a power switch and an inductor connected in series between a voltage input terminal and ground, wherein an input voltage is applied to the voltage input terminal, an output voltage is provided by a switching node between the power switch and the inductor; and the control circuit according to the present disclosure.

The switching power supply circuit, the control circuit and the control method thereof according to the embodiments of the present disclosure have following advantages.

The control circuit comprises the control unit and the driving unit. The control unit is configured to control the driving unit to provide the driving signal with different driving strengths according to the comparison result between the switching voltage and the preset voltage, so as to adjust the speed of turning the power switch on or off. By controlling the driving strength of the driving signal, the rising rate of the switching voltage can be improved, the spike of the switching voltage can be reduced, various components in the circuit can be protected from being damage by the spike, and service life and reliability of the circuit can be improved.

The control circuit according to the present disclosure can be integrated in a control chip without additional peripheral elements, which is beneficial to saving space and reducing cost; in addition, the control circuit according to the present disclosure may essentially avoids generating voltage spikes by reducing the rising rate of the switching voltage, so that there is no needless loss of system energy, and circuit reliability and efficiency may be higher.

In the control circuit according to the embodiments of the present disclosure, the voltage sample signal is obtained by sampling the switching voltage, and the voltage sample signal is compared with the reference voltage, in order to control the rising rate of the switching voltage according to the comparison result. Compared with conventional technical solutions which directly control the rising rate of the switching voltage without sampling, the efficiency of the control circuit according to embodiments of the present disclosure may be higher. Further, a rising threshold value of the switching voltage can be regulated by adjusting a proportion of resistance values of the voltage dividing resistors R1 and R2, and degrees of steepness and slowness of a falling edge of the driving signal can be adjusted by controlling the first driver and the second driver, thereby improving control flexibility of the control circuit.

Furthermore, in the control circuit according to the embodiments of the present disclosure, the sampling module and the switching node are coupled through the sampling capacitor, so that there is no loss under DC input condition, and the circuit efficiency is higher.

BRIEF DESCRIPTION OF THE DRAWINGS

The above and other objectives, advantages and features of the present invention will become more fully understood from the detailed description given hereinbelow in connection with the appended drawings, and wherein.

DETAILED DESCRIPTION OF EMBODIMENTS OF THE DISCLOSURE

The present invention will be described in more detail below with reference to the accompanying drawings. Throughout the various figures, like elements are denoted by like reference numerals. For the sake of clarity, various parts in the drawings are not drawn to scale. In addition, some well-known parts may not be shown in the figures.

Many specific details of the invention such as structures, materials, dimensions, processing techniques and techniques of corresponding components are described hereinafter, in order to make the invention better understood. However, as will be understood by those skilled in the art, the invention may be practiced without these specific details.

It should be understood that in the following description, "circuit" refers to a conductive loop formed by at least one element or sub-circuit through an electrical or electromagnetic connection. When an element or circuit is described as being "connected" to another element or being "connected" between two nodes, it may be directly coupled or connected to the other element or there may be an intermediate element, and the connection between the elements may be physical, logical, or a combination thereof. In the contrary, when an element is described as being "directly coupled" or "directly connected" to another element, it means that there is no intermediate element between them.

Figure 3:
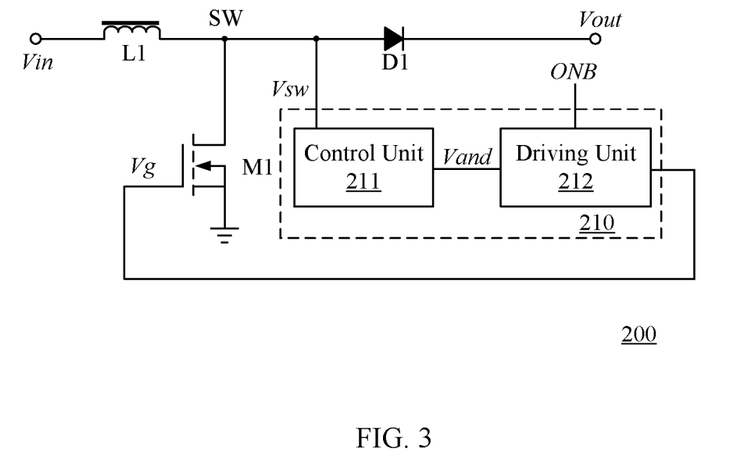
FIG. 3 shows a circuit schematic diagram of a switching power supply circuit according to a first embodiment of the present disclosure.

FIG. 3 shows a circuit schematic diagram of a switching power supply circuit according to a first embodiment of the present disclosure. The switching power supply circuit has a Boost topology. As shown in FIG. 3 the switching power supply circuit 200 comprises a main circuit and a control circuit 210. The main circuit comprises an inductor L1, a power switch M1 and a freewheeling diode D1.

The inductor L1 and the power switch M1 are connected in series between a voltage input terminal (for receiving an input DC voltage Vin) and ground, an anode of the freewheeling diode D1 is connected to a switching node between the inductor L1 and the power switch M1, and a cathode of the freewheeling is connected to a voltage output terminal for providing an output DC voltage Vout. The control circuit 210 is configured to control the power switch M1 to be turned on and off, so that a switching voltage Vsw of the switching node and a current flowing through the power switch M1 can be adjusted by switch actions between the on and off states of the power switch M1. The input DC voltage Vin charges the inductor L1 when the power switch M1 is under on state, and the inductor L1 supplies power to a load when the power switch M1 is under off state.

Further, the main circuit of the switching power supply circuit 200 also comprises an output capacitor (not shown) which can stabilize and filter the output voltage Vout.

Further, during a transition phase when the power switch M1 is being switched between "on state" and "off state", the control circuit 210 is also used to obtain the switching voltage Vsw from the switching node between the inductance L1 and the power switch M1, and to provide the power switch M1 with a driving signal Vg with different driving strengths according to the switching voltage Vsw. The driving signal Vg applied to the control terminal of the power switch M1 can be used to control the operation state of the power switch M1, and the characteristic (for example, the driving strength) of the driving signal Vg can affect the operating state of the power switch M1. For example, the driving signal Vg may affect a speed of turning the power switch on, a speed of turning the power switch off and/or the efficiency of the power switch M1. In addition, the signal strength of the driving signal Vg may affect waveform changes on the switching voltage Vsw of the switching node between the inductor L1 and the power switch M1. Controlling the driving strength of the driving signal Vg is helpful to improve the rising rate of the switching voltage Vsw, reduce the spike of the switching voltage Vsw, reduce unnecessary noise, and improve circuit efficiency and reliability.

Further, the control circuit 210 comprises a control unit 211 and a driving unit 212. The driving unit 212 provides the driving signal to the power switch M1 in accordance with the switch control signal ONB. When the power switch M1 is in the transition phase between "on state" and "off state", the control unit 211 is configured to obtain the switching voltage Vsw from the switching node between the inductor L1 and the power switch M1, a logic control signal V and is generated according to a comparison result between the switching voltage Vsw and a preset voltage, and the driving unit 212 is controlled to provide the driving signal Vg with different driving strengths according to the logic control signal, so as to adjust the speed of turning the power switch M1 off.

The driving signal Vg is configured to charge and discharge the control terminal of the power switch M1. During a phase for discharging the control terminal of the power switch M1: the driving signal Vg has a first driving strength when the switching voltage Vsw is lower than the preset voltage; the driving signal Vg has a second driving strength lower than the first driving strength when the switching voltage Vsw is greater than/equal to the preset voltage, so as to reduce the speed of turning the power switch M1 off. During the above two phases, the control unit 211 controls the driving unit 212 to provide the driving signal Vg with different driving strengths, and each phase can be independently controlled, so as to obtain a desired rising rate of the switching voltage Vsw.

Figure 4:
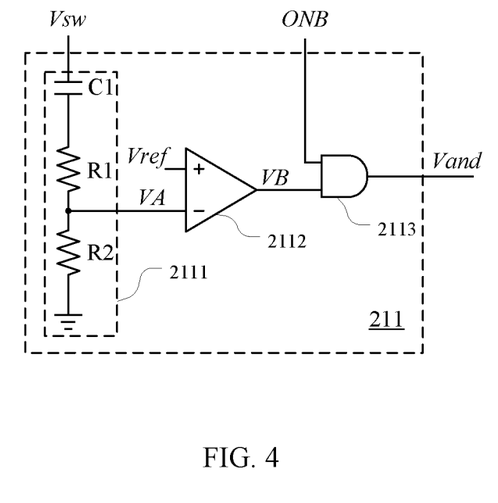
FIG. 4 shows a circuit diagram of the control unit as shown in FIG. 3.

FIG. 4 shows a schematic diagram of the structure of the control unit as shown in FIG. 3. As shown in FIG. 4, the control unit 211 comprises a sampling module 2111 a comparator 2112 and a logic module 2113. The sampling module 2111 is configured to obtain a voltage sample signal VA according to the switching voltage Vsw when the power switch M1 is in the transition phase between "on state" and "off state".

A positive input terminal of the comparator 2112 is configured to receive a reference voltage signal Vref, and an inverting input terminal of the comparator 2112 is configured to receive the voltage sample signal VA, and the comparator 2112 is configured to compare the voltage sample signal VA with the reference voltage signal Vref to obtain a result signal VB. When the voltage sample signal VA is lower than the reference voltage signal Vref, the result signal VB outputted by the comparator 2112 is at "high level"; when the voltage sample signal VA is greater than/equal to the reference voltage signal Vref, the result signal VB outputted by the comparator 2112 is at "low level".

The logic module 2113 is implemented, for example, by an AND gate and is configured to generate the logic control signal V and by performing an AND operation on a logic value of the switch control signal ONB and a logic value of the result signal VB.

Further, the sampling module 2111 comprises a sampling capacitor C1, a resistor R1 and a resistor R2 connected in series between the switching node SW and the ground, wherein the switching node is a node between the power switch M1 and the inductor L1, and the voltage sample signal VA is provided by an intermediate node of the resistor R1 and the resistor R2. When the voltage of the switching node SW rises, a voltage of a lower plate of the sampling capacitor C1 changes with the voltage at the switching node SW, and the voltage sample signal VA, which is obtained by dividing the voltage of the lower plate of the capacitor C1 by use of the resistor R1 and the resistor R2, gradually increases. Furthermore, the sampling capacitor C1 is a high-voltage capacitor, which can be applied to a situation that the voltage at the switching node SW is high, so as to prevent low voltage devices in the circuit from being broken down when the voltage at the switching node SW is high.

Figure 5:
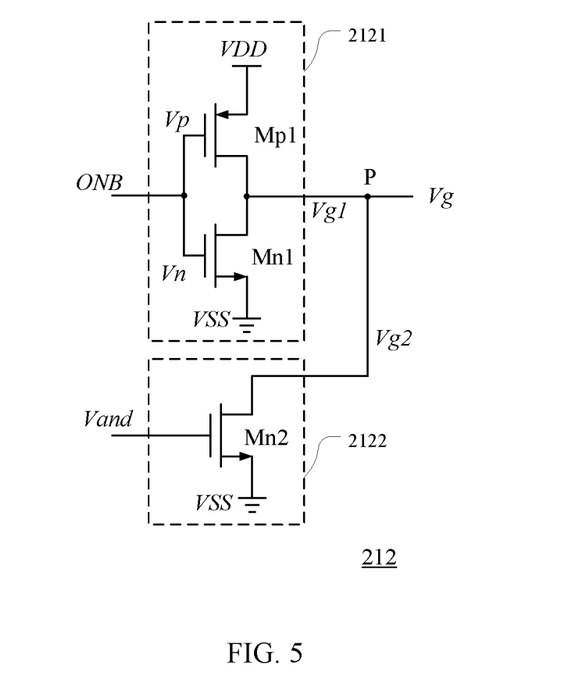
FIG. 5 shows a schematic circuit diagram of the driving unit as shown in FIG. 3.

FIG. 5 shows a schematic diagram of a structure of the driving unit as shown in FIG. 3. As shown in FIG. 5, the driving unit 212 comprises a first driver 2121 and a second driver 2122. The first driver 2121 is configured to provide a first driving signal Vg1 according to the switch control signal ONB, the second driver 2122 is configured to provide a second driving signal Vg2 according to the logic control signal Vand, and an output terminal of the first driver 2121 and an output terminal of the second driver 2122 are connected to an output node P. The first driving signal Vg1 and the second driving signal Vg2 are superimposed on the output node P for providing the driving signal Vg.

Further, the first driving signal Vg1 is configured to charge or discharge the output node P according to different level states of the switch control signal ONB, and the second driving signal Vg2 is configured to discharge the output node P according to the logic control signal Vand. The output node P is connected to the control terminal of the power switch M1, and the control unit 211 is configured to control an effective impedance of the driving unit 212 in different phases by controlling a charging/discharging process of the first driver 2121 and/or the second driver 2122, so as to control the rising rate of the switching voltage Vsw.

As a non-limiting example, the first driver 2121 comprises a P-type transistor Mp1 and an N-type transistor Mn1 connected in series between a pair of reference voltages (shown in the figure as VDD and VSS). A control terminal of the P-type transistor Mp1 and a control terminal of the N-type transistor Mn1 are connected to each other to receive the switch control signal ONB, a first terminal of the P-type transistor Mp1 is connected to the reference voltage VDD, and a first terminal of the N-type transistor Mn1 is connected to the reference voltage VSS. The reference voltage VDD is larger than the reference voltage VSS, the P-type transistor Mp1 provides the reference voltage VDD to the output node P when the P-type transistor Mp1 is under on state, so as to charge the output node P, and the N-type transistor Mn1 provides the reference voltage VSS to the output node P when the N-type transistor Mn1 is under on state, so as to discharge the output node P. The second driver 2122 includes an N-type transistor Mn2 serially connected between the output node P and the reference voltage VSS. A control terminal of the N-type transistor Mn2 receives the logic control signal Vand, a first terminal of the N-type transistor Mn2 is connected to the reference voltage VSS, and a second terminal of the N-type transistor Mn2 is connected to the output node P. The N-type transistor Mn2 provides a reference voltage VSS to the output node P when the N-type transistor Mn2 is under on state, so as to discharge the output node P.

When the switch control signal ONB and the logic control signal Vand are at "low level", the P-type transistor Mp1 is turned on, the N-type transistors Mn1 and Mn2 are turned off, and the voltage at the control terminal of the power switch M1 is approximately equal to the reference voltage VDD; when the switch control signal ONB and the logic control signal are at "high level", the P-type transistor Mp1 is turned off, the N-type transistors Mn1 and Mn2 are turned on, and the voltage at the control terminal of the power switch M1 is approximately equal to the reference voltage VSS.

Further, when the power switch M1 is switched from "on state" to "off state", the switch control signal ONB changes from "low level" to "high level"; when the power switch M1 is switched from "off state" to "on state", the switch control signal ONB changes from "high level" to "low level".

Further, when the power switch M1 is switched from "on state" to "off state", if the voltage sample signal VA is greater than/equal to the reference voltage signal Vref, then the result signal VB is at "low level", the logic control signal Vand is at "low level", and the N-type transistor Mn2 is turned off. Therefore, during the transition phase when the power switch M1 is being switched between "on state" and "off state", a process for discharging the second driver can be controlled according to the output result of the comparator in the control unit, so that the driving strength of the driving signal Vg can be changed accordingly.

Figure 6:
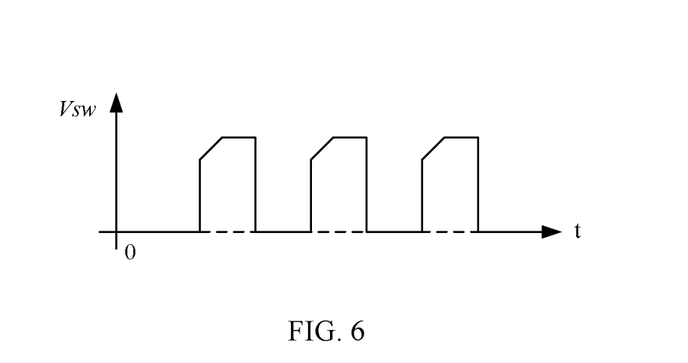
FIG. 6 shows a voltage waveform diagram of the node SW between the inductor and the power switch as shown in FIG. 3.

During the transition phase when the power switch M1 is being switched from "on state" to "off state", the switch control signal ONB is changed from "low level" to "high level", the P-type transistor Mp1 is turned off, the N-type transistor Mn1 is turned on, a voltage of the driving signal Vg gradually decreases, at this time, the voltage sample signal VA is lower than the reference voltage signal Vref, therefore the result signal VB outputted by the comparator is at "high level", the logic control signal Vand outputted by the logic module 2113 is at "high level", the N-type transistor Mn2 is turned on, an effective impedance of a current path for discharging the voltage at the control terminal of the power switch M1 is low, the driving signal Vg is reduced to the reference voltage VSS at a faster speed, and the switching voltage Vsw is rapidly increased. When the voltage sample signal VA is greater than/equal to the reference voltage signal Vref, the output of the comparator is flipped, as a result, the signal VB becomes "low level", the logic control signal Vand outputted by the logic module becomes "low level", the N-type transistor Mn2 is turned off, and at this time, the effective impedance of the current path for discharging the voltage at the control terminal of the power switch M1 increases, which changes the speed of reducing the driving signal Vg to the reference voltage VSS, reduces the speed of turning the power switch M1 off, reduces the spike of the switching voltage Vsw, reduces unnecessary noise, and improves circuit efficiency and reliability, as shown in FIG. 6.

In the above-described embodiments, each of the power switching transistor M1 and the transistors Mn1 and Mn2 is, for example, a field-effect transistor with an N-type channel (NMOS field-effect transistor). In these embodiments, "control terminal", "first terminal" and "second terminal" are, for example, "gate", "source" and "drain" of a corresponding field effect transistor, respectively. The transistor Mp1 is, for example, a field-effect transistor with a P-type channel (NMOS field-effect transistor). In these embodiments, "control terminal", "first terminal" and "second terminal" are, for example, "gate", "source" and "drain" of a corresponding field effect transistor, respectively.

It should be understood that each transistor described in the above embodiments can be implemented by a field effect transistor, but the present invention is not limited thereto. In other embodiments of the present invention, each transistor described in the above embodiments can also be implemented by a bipolar transistor, accordingly, "control terminal", "first terminal" and "second terminal" in the embodiments are "base", "emitter" and "collector" of a corresponding bipolar transistor, respectively.

In the above embodiments, the reference voltage VSS may be a voltage to the ground, a negative supply voltage or a lowest negative supply voltage or the like. The reference voltage VDD can be a power supply, a positive power supply voltage, a highest positive power supply voltage, etc.

Figure 7:
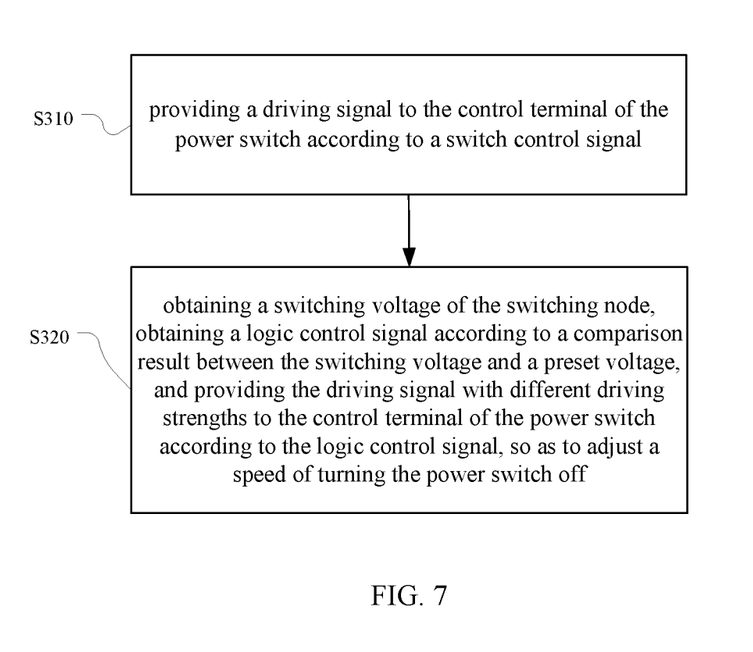
FIG. 7 shows a flow diagram of a control method of a switching power supply circuit according to a second embodiment of the present disclosure.

FIG. 7 shows a flow diagram of a control method of a switching power supply circuit according to a second embodiment of the present disclosure, wherein the switching power supply circuit can be implemented, for example, by the switching power supply circuit according to the above-described embodiments, which comprises a main circuit and a control circuit. The main circuit comprises an inductor L1, a power switch M1 and a freewheeling diode DE The inductor L1 and the power switch M1 are connected in series between an input voltage terminal and ground, wherein an input DC voltage Vin is applied to the voltage input terminal, an anode of the freewheeling diode D1 is connected to a switching node between the inductor L1 and the power switch M1, and a cathode of the freewheeling diode D1 is connected to a voltage output terminal for providing an output DC voltage Vout. The control circuit is configured to control the power switch M1 to be turned on and off, so that a switching voltage Vsw of the switching node and a current flowing through the power switch M1 can be adjusted by switch actions between on and off states of the power switch M1. The input DC voltage Vin charges the inductor L1 when the power switch M1 is under on state, and the inductor L1 provides power to a load when the power switch M1 is under off state.

As shown in FIG. 7, the control method comprises steps S310-S320.

In step S310, a driving signal is provided to the control terminal of the power switch according to a switch control signal.

In step S320, a switching voltage of the switching node is obtained, a logic control signal is obtained according to a comparison result between the switching voltage and a preset voltage, and the driving signal with different driving strengths is provided to the control terminal of the power switch according to the logic control signal to adjust a speed of turning the power switch off. The driving signal is configured to charge or discharge the control terminal of the power switch. During a phase for discharging the control terminal of the power switch, the driving signal has a first driving strength when the switching voltage is lower than the preset voltage, and the driving signal has a second driving strength lower than the first driving strength when the switching voltage is greater than/equal to the preset voltage.

The driving signal is configured to charge and discharge the control terminal of the power switch M1 according to different level states of the switch control signal. During the phase for discharging the control terminal of the power switch, the switch control signal is at "high level", and the control terminal of the power switch is discharged by the driving signal. During a phase for charging the control terminal of the power switch, the switch control signal is at "low level", and the control terminal of the power switch is charged by the driving signal.

Further, the control method further comprises: obtaining a first driving signal and a second driving signal according to the switch control signal and the logic control signal, respectively, and obtaining the driving signal according to a superposition of the first driving signal and the second driving signal.

Further, the control method further comprises following steps: obtaining a voltage sample signal according to the switching voltage; comparing the voltage sample signal with a reference voltage signal representing the preset voltage to obtain a result signal; and obtaining the logic control signal according to the switch control signal and the result signal.

Specifically, during a transition phase when the power switch is being switched from "on state" to "off state", the switch control signal changes from "low level" to "high level", the control terminal of the power switch is discharged by the first driving signal, so that the driving signal gradually decreases, at this time, the voltage sample signal is lower than the reference voltage signal, thus the result signal is at "high level", and the logic control signal is at "high level", and the control terminal of the power switch is also discharged by the second driving signal. Because of the superposition of the first driving signal and the second driving signal, an effective impedance of a current path for discharging a voltage at the control terminal of the power switch is low, the driving signal is reduced to the reference voltage VSS at a faster speed, and the switching voltage increases rapidly. When the voltage sample signal is greater than/equal to the reference voltage signal, the signal becomes "low level", the logic control signal also changes to "low level", the second driving signal stops discharging the control terminal of the power switch. At this time, due to the superposition of the first driving signal and the second driving signal, the effective impedance of the voltage discharge path of the control terminal of the power switch increases, which changes the speed of reducing the driving signal to the reference voltage VSS, reduces the speed of turning the power switch off, reduces the spike of the switching voltage, reduces unnecessary noise, and improves circuit efficiency and reliability.

To sum up, according to the embodiments of the present disclosure, a switching power supply circuit and a control circuit and a control method thereof are provided. The control circuit comprises a control unit and a driving unit. The control unit is configured to control the driving unit to provide a driving signal with different driving strengths according to a comparison result between a switching voltage and a preset voltage, so as to adjust a speed of turning the power switch on or off. By controlling the driving strength of the driving signal, a rising rate of the switching voltage can be improved, a spike of the switching voltage can be reduced, various components in the circuit can be protected from being damaged by the spike, and service life and reliability of the circuit can be improved.

In addition, the control circuit according to the embodiments of the present disclosure can be integrated in a control chip without additional peripheral elements, which is beneficial to saving space and reducing cost. Moreover, the control circuit according to the embodiments of the present disclosure may essentially avoid generating voltage spikes by reducing the rising rate of the switching voltage, so that there is no needless loss of system energy, and circuit reliability and efficiency may be higher.

In the control circuit according to the embodiments of the present disclosure, the voltage sample signal is obtained by sampling the switching voltage, and the voltage sample signal is compared with the reference voltage, in order to control the rising rate of the switching voltage according to the comparison result. Compared with conventional technical solutions directly control the rising rate of the switching voltage without sampling, the efficiency of the control circuit according to the embodiments of the present disclosure may be higher. Further, a rising threshold value of the switching voltage can be adjusted by regulated by adjusting a proportion of resistance values of the voltage dividing resistors R1 and R2, and degrees of steepness and slowness of a falling edge of the driving signal can be adjusted by controlling the first driver and the second driver, thereby improving control flexibility of the control circuit.

Furthermore, in the control circuit of the embodiments of the present disclosure, the sampling module and the switching node are coupled through the sampling capacitor, so that there is no loss under DC input condition and the circuit efficiency is higher.

It should be noted that relational terms, such as first, second, etc., are used herein only to distinguish one entity or operation from another and do not necessarily require or imply any such actual relationship or order between these entities or operations. Moreover, terms "including", "comprising" or any other variation thereof are intended to encompass non-exclusive inclusion, so that a process, method, article or equipment including a set of elements, may not only include those elements, but may also include other elements that are not explicitly listed, or may further include elements inherent to such process, method, article or equipment. In the absence of more limitations, an element limited by a statement "comprises a . . . " does not preclude an existence of another identical element in the process, method, article or equipment including said element.

The above embodiments of the present disclosure are not exhaustively described in all details, and the invention is limited to these specific embodiments as described. Obviously, according to the above descriptions, many modifications and changes can be made. These embodiments are selected and specifically described in this specification in order to better explain the principles and practical applications of the invention, thereby enabling those skilled in the art to make good use of the invention and modifications based on the invention. The invention is limited only by the claims and their full scope and equivalents.

What is claimed is:

1. A control circuit of a switching power supply circuit, wherein the switching power supply circuit comprises a power switch and an inductor connected in series between a voltage input terminal and ground, an input voltage is applied to the voltage input terminal, an output voltage is provided by a switching node between the power switch and the inductor, and the control circuit comprises:
   a driving unit, configured to provide a driving signal to a control terminal of the power switch according to a switch control signal; and
   a control unit, which is connected with the switching node to obtain a switching voltage, configured to obtain a logic control signal according to a comparison result between the switching voltage and a preset voltage, and configured to control the driving unit to provide the driving signal with different driving strengths according to the logic control signal, so as to adjust a speed of turning the power switch off,
   wherein, the driving signal is configured to charge or discharge the control terminal of the power switch, during a phase for discharging the control terminal of the power switch, the driving signal has a first driving strength when the switching voltage is lower than the preset voltage, and the driving signal has a second driving strength lower than the first driving strength when the switching voltage is greater than/equal to the preset voltage.

2. The control circuit according to claim 1, wherein the driving unit comprises:
   a first driver configured to provide a first driving signal according to the switch control signal;
   a second driver configured to provide a second driving signal according to the logic control signal; and
   an output node, on which the first driving signal and the second driving signal are superimposed to provide the driving signal.

3. The control circuit according to claim 2, wherein the control unit comprises:
   a sampling module configured to obtain a voltage sample signal according to the switching voltage;
   a comparator configured to compare the voltage sample signal with a reference voltage signal which represents the preset voltage, so as to obtain a result signal; and
   a logic module configured to obtain the logic control signal according to the switch control signal and the result signal.

4. The control circuit according to claim 3, wherein, during a phase for discharging the control terminal of the power switch:
   when the result signal indicates that the voltage sample signal is lower than the reference voltage signal, the output node is discharged by the first driving signal and the second driving signal, so that the driving signal with the first driving strength is obtained;
   when the result signal indicates that the voltage sample signal is greater than/equal to the reference voltage signal, the output node is discharged by the first driving signal, and the second driving signal stops discharging the output node, so that the driving signal with the second driving strength is obtained.

5. The control circuit according to claim 4, further comprising: charging the output node by the first driving signal during a phase for charging the control terminal of the power switch.

6. The control circuit according to claim 3, wherein the logic module is an AND gate.

7. The control circuit according to claim 3, wherein the sampling module comprises:
a first resistor and a second resistor connected in series between the switching node and a reference ground, wherein a second end of the first resistor is connected to a first end of the second resistor and is configured to provide the voltage sample signal, and a second end of the second resistor is connected to the reference ground; and
a sampling capacitor connected between the switching node and the first end of the first resistor.

8. The control circuit according to claim 7, wherein the sampling capacitor is a high-voltage capacitor.

9. The control circuit according to claim 2, wherein the first driver comprises a first transistor and a second transistor connected in series between a first reference voltage and a second reference voltage,
a control terminal of the first transistor and a control terminal of the second transistor are connected to each other to receive the switch control signal,
wherein, the first reference voltage is greater than the second reference voltage, the first transistor is configured to charge the output node according to the first reference voltage when the first transistor is under on state, the second transistor is configured to discharge the output node according to the second reference voltage when the second transistor is under on state.

10. The control circuit according to claim 9, wherein the second driver comprises a third transistor connected between the output node and the second reference voltage,
a control terminal of the third transistor receives the logic control signal,
wherein, the third transistor is configured to discharge the output node according to the second reference voltage when the third transistor is under on state.

11. The control circuit according to claim 10, wherein the first transistor is a P-type field effect transistor, and the second transistor and the third transistor are N-type field effect transistors.

12. A control method of a switching power supply circuit, wherein the switching power supply circuit comprises a power switch and an inductor connected in series between a voltage input terminal and ground, an input voltage is applied to the voltage input terminal, an output voltage is provided by a switching node between the power switch and the inductor, and the control method comprises:
providing a driving signal to a control terminal of the power switch according to a switch control signal; and
obtaining a switching voltage of the switching node, obtaining a logic control signal according to a comparison result between the switching voltage and a preset voltage, and providing the driving signal with different driving strengths to the control terminal of the power switch according to the logic control signal, so as to adjust a speed of turning the power switch off,
wherein, the driving signal is configured to charge or discharge the control terminal of the power switch, during a phase for discharging the control terminal of the power switch, the driving signal has a first driving strength when the switching voltage is lower than the preset voltage, and the driving signal has a second driving strength lower than the first driving strength when the switching voltage is greater than/equal to the preset voltage.

13. The control method according to claim 12, further comprising:
providing a first driving signal according to the switch control signal;
providing a second driving signal according to the logic control signal; and
providing the driving signal according to a superposition of the first driving signal and the second driving signal.

14. The control method according to claim 13, wherein the step of obtaining the logic control signal according to the comparison result of the switching voltage and the preset voltage comprises:
obtaining a voltage sample signal according to the switching voltage;
comparing the voltage sample signal with a reference voltage signal which represents the preset voltage, so as to obtain a result signal; and
obtaining the logic control signal according to the switch control signal and the result signal.

15. The control method according to claim 14, wherein, during the phase for discharging the control terminal of the power switch:
when the result signal indicates that the voltage sample signal is lower than the reference voltage signal, the output node is discharged by the first driving signal and the second driving signal, so that the driving signal with the first driving strength is obtained,
when the result signal indicates that the voltage sample signal is greater than/equal to the reference voltage signal, the output node is discharged by the first driving signal, and the second driving signal stops discharging the output node, so that the driving signal with the second driving strength is obtained.

16. The control method according to claim 15, further comprising: charging the output node by the first driving signal during a phase for charging the control terminal of the power switch.

17. The control method according to claim 14, wherein the logic control signal is obtained according to an AND operation result of a logic value of the switch control signal and a logic value of the result signal.

18. A switching power supply, comprising a control circuit, a power switch and an inductor connected in series between a voltage input terminal and ground, wherein an input voltage is applied to the voltage input terminal, and an output voltage is provided by a switching node between the power switch and the inductor; and the control circuit comprises:
a driving unit, configured to provide a driving signal to a control terminal of the power switch according to a switch control signal; and
a control unit, which is connected with the switching node to obtain a switching voltage, configured to obtain a logic control signal according to a comparison result between the switching voltage and a preset voltage, and configured to control the driving unit to provide the driving signal with different driving strengths according to the logic control signal, so as to adjust a speed of turning the power switch off,
wherein, the driving signal is configured to charge or discharge the control terminal of the power switch, during a phase for discharging the control terminal of the power switch, the driving signal has a first driving strength when the switching voltage is lower than the preset voltage, and the driving signal has a second driving strength lower than the first driving strength when the switching voltage is greater than/equal to the preset voltage.

* * * * *